US012103817B2

(12) United States Patent
Talonen et al.

(10) Patent No.: US 12,103,817 B2
(45) Date of Patent: Oct. 1, 2024

(54) MEASUREMENT ARRANGEMENT AND METHOD OF MONITORING ROTATION SPEED OF A COMPONENT OF AN ELEVATOR, ESCALATOR, MOVING WALKWAY OR MOVING RAMP

(71) Applicant: Kone Corporation, Helsinki (FI)

(72) Inventors: Tapani Talonen, Helsinki (FI); Jyrki Jokinen, Helsinki (FI); Henri Wenlin, Helsinki (FI); Matti Rasanen, Helsinki (FI); Mikko Viljanen, Helsinki (FI)

(73) Assignee: Kone Corporation, Helsinki (FI)

( * ) Notice: Subject to any disclaimer, the term of this patent is extended or adjusted under 35 U.S.C. 154(b) by 126 days.

(21) Appl. No.: 17/564,719

(22) Filed: Dec. 29, 2021

(65) Prior Publication Data

US 2022/0119222 A1  Apr. 21, 2022

Related U.S. Application Data

(63) Continuation of application No. PCT/FI2020/050394, filed on Jun. 4, 2020.

(30) Foreign Application Priority Data

Jul. 5, 2019  (EP) .................................... 19184714

(51) Int. Cl.
*B66B 1/34* (2006.01)
*B66B 5/00* (2006.01)
(Continued)

(52) U.S. Cl.
CPC .......... *B66B 1/3492* (2013.01); *B66B 5/0018* (2013.01); *B66B 25/006* (2013.01); *G01P 3/48* (2013.01)

(58) Field of Classification Search
CPC ... B66B 1/3492; B66B 5/0018; B66B 25/006; G01P 3/48
(Continued)

(56) References Cited

U.S. PATENT DOCUMENTS 11,981,539 B2 * 5/2024 Wurth ...................... B66B 5/02
2013/0057118 A1 * 3/2013 Benkert .................. G01P 3/443
310/67 R
(Continued)

FOREIGN PATENT DOCUMENTS

CN    103038523 A    4/2013
DE      1945692 A1   4/1971
(Continued)

OTHER PUBLICATIONS

He, Whole Sealed Large Floating Platform Transport System, Feb. 16, 2000, CN1244610A (Year: 2000).*
(Continued)

*Primary Examiner* — Gene O Crawford
*Assistant Examiner* — Lester Rushin, III
(74) *Attorney, Agent, or Firm* — Harness, Dickey & Pierce, P.L.C.

(57) ABSTRACT

The measurement arrangement for measuring the rotation speed of a component of an elevator, escalator, moving walkway or moving ramp comprises an inductive sensor that is arranged stationary in respect of a rotation axis of the component and adjacent to the component or a measurement part that is attached to the component in a rotationally fixed manner, and the component or the measurement part is configured as rotationally unsymmetrical about the rotation axis so that different angular positions of the component about the rotation axis generate different output signals in the inductive sensor.

20 Claims, 5 Drawing Sheets

(51) Int. Cl.
B66B 25/00 (2006.01)
G01P 3/48 (2006.01)

(58) Field of Classification Search
USPC .......................................................... 198/393
See application file for complete search history.

(56) References Cited

U.S. PATENT DOCUMENTS

2017/0336192 A1    11/2017   Moser et al.
2019/0170497 A1    6/2019    Ausserlechner

FOREIGN PATENT DOCUMENTS

| DE | 102005021300 A1 | 11/2006 | | |
|---|---|---|---|---|
| DE | 102017128869 B3 | 5/2019 | | |
| EP | 3848318 A1 * | 7/2021 | ........... | B66B 25/006 |
| GB | 2563398 A | 12/2018 | | |
| JP | 2002162252 A | 6/2002 | | |
| WO | WO-2004096689 A2 | 11/2004 | | |
| WO | WO-2005/010464 A1 | 2/2005 | | |
| WO | WO-2016190281 A1 | 12/2016 | | |

OTHER PUBLICATIONS

Alvarez, A Method to Predict a Deterioration in a Passenger Moving System, 2021 EP 3848318 A1 (Year: 2021).*
JP 2021032714 A (Year: 2021).*
CN 110498330 A , Park C-J (Year: 2019).*
Written Opinion for International Application No. PCT/FI2020/050394 dated Sep. 10, 2020.
International Search Report for International Application No. PCT/FI2020/050394 dated Sep. 10, 2020.
European Search Report for European Patent Application No. 19184714 dated Feb. 18, 2020.
Chinese Office Action dated Sep. 27, 2023 for corresponding CN Patent Application No. 202080047519.9.

* cited by examiner

MEASUREMENT ARRANGEMENT AND METHOD OF MONITORING ROTATION SPEED OF A COMPONENT OF AN ELEVATOR, ESCALATOR, MOVING WALKWAY OR MOVING RAMP

CROSS-REFERENCE TO RELATED APPLICATION

This application is a continuation of PCT International Application No. PCT/FI2020/050394 which has an International filing date of Jun. 4, 2020, and which claims priority to European patent application number 19184714.4 filed Jul. 5, 2019, the entire contents of both of which are incorporated herein by reference.

TECHNICAL FIELD OF THE INVENTION

The present invention relates to a measurement arrangement for measuring the rotation speed of a component of an elevator, escalator, moving walkway or moving ramp in accordance with claim 1. The invention also concerns a method of monitoring the rotation speed of a component of an elevator, escalator, moving walkway or moving ramp as defined in the other independent claim.

BACKGROUND OF THE INVENTION

For various reasons, it is crucial to know in elevators the speed and/or the position of an elevator car and/or a counterweight of the elevator. The position of an elevator car in a shaft can be determined for example by means of a linear encoder. A problem related to the use of linear encoders is that a linear encoder requires a scale which must extend over the whole length of the shaft, which makes the linear encoders awkward and vulnerable. For example, dirt can affect the reliability of linear encoders. Another solution for determining the speed and/or position of an elevator car is an encoder having a friction wheel that is engaged with a guide rail of the elevator car. A problem of this solution is possible wheel slippage, which makes such encoders unreliable. Also in escalators, moving walkways and moving ramps there is a need for a reliable and cost efficient way of determining the speed and/or position of different components.

SUMMARY OF THE INVENTION

An object of the present invention is to provide an improved measurement arrangement for measuring the rotation speed of a component of an elevator, escalator, moving walkway or moving ramp. The characterizing features of the arrangement according to the invention are given in claim 1. Another object of the invention is to provide an improved method of monitoring the rotation speed of a component of an elevator, escalator, moving walkway or moving ramp. The characterizing features of the method according to the invention are given in the other independent claim.

In the arrangement according to the invention, the component is rotatable about a rotation axis, the arrangement comprises an inductive sensor that is arranged stationary in respect of the rotation axis of the component and adjacent to the component or adjacent to a measurement part that is attached to the component in a rotationally fixed manner, and the component or the measurement part is configured as rotationally unsymmetrical about the rotation axis so that different angular positions of the component about the rotation axis generate different output signals in the inductive sensor.

In the method according to the invention, the rotation speed of a component of an elevator, escalator, moving walkway or moving ramp is monitored by means of a measurement arrangement defined above.

With the measuring arrangement and the method according to the invention, the rotation speed of a rotating component for example in an elevator can be determined reliably in an inexpensive way. The measuring arrangement is not sensitive to dirt and mechanical contact between the rotating part and the sensor is not needed. Based on the speed measurement, also the position of an elevator car, counterweight or the like can be determined.

According to an embodiment of the invention, the component or the measurement part is provided with a surface that is shaped and/or positioned so that the distance from the surface to the inductive sensor changes as the component rotates about the rotation axis and the inductive sensor is arranged to detect the changing distance between the surface and the inductive sensor.

The surface can be, for instance, a plane that is arranged in respect of the rotation axis of the component at an angle that differs from 90 degrees.

Alternatively, the surface can be a non-circular outer perimeter of the component or the measurement part. The surface could also be a surface of a circular groove or cutting.

According to an embodiment of the invention, the component is a sheave, a pulley or a chain wheel, or an axle or shaft supporting a sheave, a pulley or a chain wheel.

According to an embodiment of the invention, the component or the measurement part is provided with an area of removed or added material for compensating the effect of the unsymmetrical shape of the component or the measurement part on the inertial forces of the component or the measurement part.

According to an embodiment of the invention, the component or the measurement part comprises a drilling for compensating the effect of the unsymmetrical shape of the component or the measurement part on the inertial forces of the component or the measurement part.

According to an embodiment of the invention, the component is attached to an elevator car or to a counterweight of an elevator.

According to an embodiment of the invention, the component or the measurement part is configured so that each angular position of the component about the rotation axis generates a unique output signal in the inductive sensor. This allows the absolute angular position of the component to be determined using a single inductive sensor.

A monitoring system according to the invention comprises a measurement arrangement defined above arranged to monitor the rotation speed of a component of an elevator, escalator, moving walkway or moving ramp.

An elevator according to the invention comprises a measurement arrangement defined above.

According to an embodiment of the invention, the elevator comprises a first measurement arrangement that is arranged to monitor the rotation speed of a pulley of an elevator car and a second monitoring arrangement that is arranged to monitor the rotation speed of a pulley of a counterweight of the elevator. This allows for example detection of stalling of the elevator car or the counterweight.

BRIEF DESCRIPTION OF THE DRAWINGS

Embodiments of the invention are described below in more detail with reference to the accompanying drawings, in which.

DESCRIPTION OF EMBODIMENTS OF THE INVENTION

Figure 1:
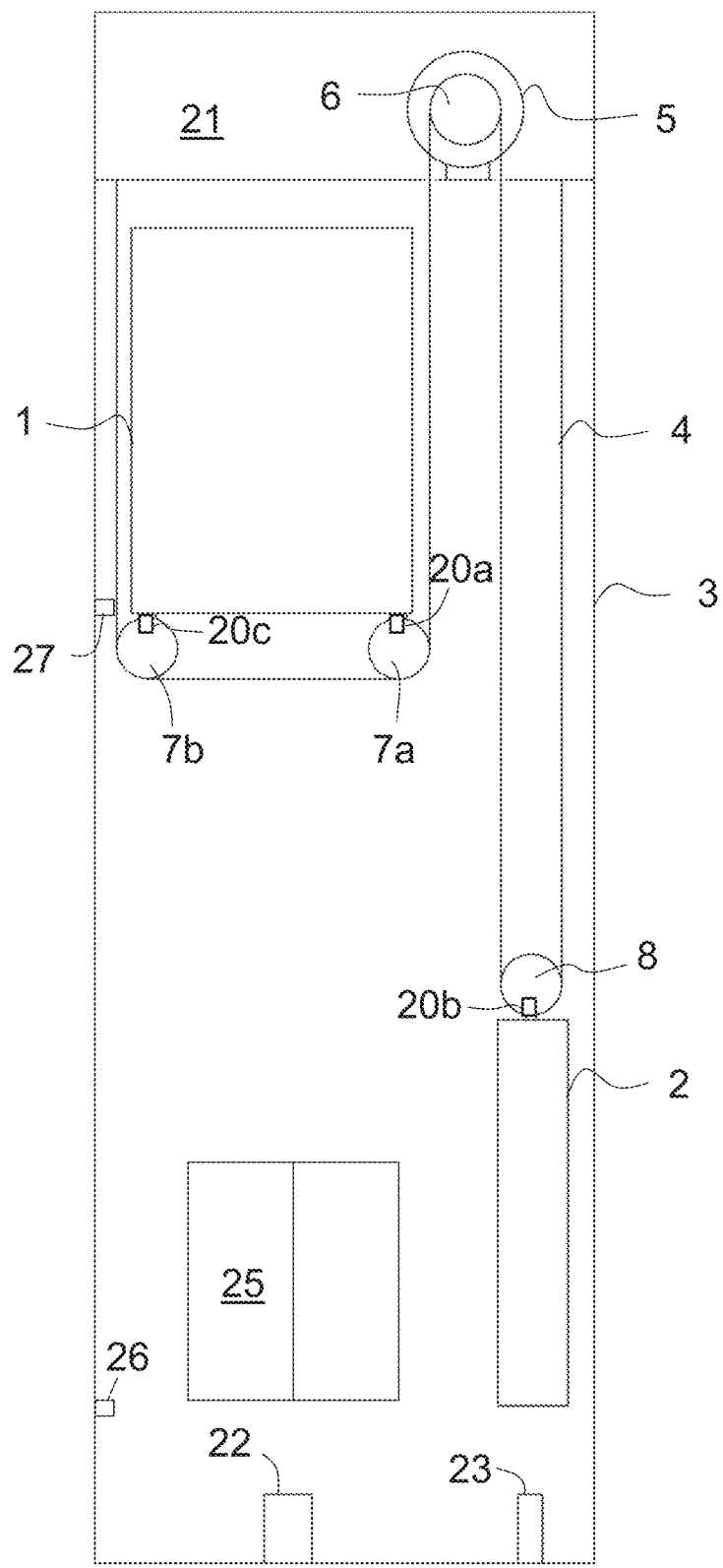
FIG. 1 shows schematically a simplified view of an elevator.

In FIG. 1 is shown schematically a simplified view of an elevator. The elevator comprises an elevator car 1 and a counterweight 2 which are configured to be moved in the vertical direction in a shaft 3. For the sake of clarity, many parts of the elevator, such as guide rails for the elevator car 1 and the counterweight 2 have been omitted in FIG. 1. The elevator car 1 is connected to the counterweight 2 via a hoisting member 4. The hoisting member 4 can be, for example, a steel wire, a belt, such as a toothed belt or a flat belt, a carbon fiber rope or a coated rope. The elevator can comprise several hoisting members 4. The elevator car 1 and the counterweight 2 are connected to each other in such a way that they move to opposite directions in respect of each other. The elevator is further provided with a motor 5. The motor 5 is preferably an electric motor. The motor 5 drives a sheave 6. The sheave 6 can be connected to the motor 5 either directly or via a gear. As the sheave 6 rotates, the hoisting member 4 moves and the elevator car 1 and the counterweight 2 are moved. In the example of FIG. 1, each end of the hoisting member 4 is fixed to the upper end of the shaft 3. The elevator car 1 is provided with a first pulley 7a and a second pulley 7b. In the example of FIG. 1, the pulleys 7a, 7b are arranged below the elevator car 1. The hoisting member 4 is engaged with the first pulley 7a and the second pulley 7b. The pulleys 7a, 7b of the elevator car 1 are configured to rotate freely about a rotation axis. The counterweight 2 is provided with a pulley 8 which is engaged with the hoisting member 4. Also the pulley 8 of the counterweight 2 is configured to rotate freely about a rotation axis. The sheave 6, the pulleys 7a, 7b, 8 and the hoisting member 4 form the roping system of the elevator.

It should be noted that FIG. 1 shows only an example of a roping system of an elevator, and the hoisting member 4 could be arranged in many alternative ways. For example, the elevator car 1 could be provided with a single pulley. The counterweight 2 could be provided with more than one pulleys. A first end of the hoisting member 4 could be attached to the elevator car 1 and a second end of the hoisting member 4 could be attached to the counterweight 2. The hoisting member 4 could be guided around the sheave 6 of the motor 5 twice.

In the example of FIG. 1, the motor 5 is arranged in a machine room 21 which is located above the shaft 3. However, the elevator could also be a machine-room-less elevator. The motor 5 could thus be arranged in the shaft 3. The motor 5 could be arranged either at the upper end or at the lower end of the shaft 3. The lower end of the shaft 3 is provided with at least one end buffer 22 for the elevator car 1 and at least one end buffer 23 for the counterweight 2. The purpose of the end buffers 22, 23 is to stop the elevator car 1 or the counterweight 2 if the elevator car 1 or the counterweight 2 descends beyond its normal moving range. The buffers 22, 23 are configured to accumulate or dissipate the kinetic energy of the elevator car 1 or the counterweight 2 in case the elevator car 1 or the counterweight 2 hits the buffer 22, 23 and thus limit the deceleration of the elevator car 1 or the counterweight 2 in such a situation. FIG. 1 also shows the doors 25 of the shaft 3 at the lowermost landing.

In elevators it is crucial to know precisely the speed and the position of the elevator car 1. Speed information can be used, for example, to detect overspeed of the elevator, for controlled slowdown when the elevator car 2 approaches an end of the shaft 3, or for detecting stalling of the elevator car 1 or the counterweight 2. Position information is needed, for instance, when the elevator car 1 approaches an end of the shaft 3. For monitoring the speed and position of various parts of the elevator, the elevator can be provided with different sensors and measurement arrangements. FIG. 1 shows a first measurement arrangement 20a which is arranged to measure the rotation speed of the first pulley 7a of the elevator car 1. A second measurement arrangement 20b is arranged to measure the rotation speed of the pulley 8 of the counterweight 2. A third measurement arrangement 20c is arranged to measure the rotation speed of the second pulley 7b of the elevator car 1. FIG. 1 further shows a sensor 26 that is configured to detect that the elevator car 1 is at the lowermost landing and another sensor 27 that is configured to detect that the elevator car 1 is at the uppermost landing.

The rotation speed of a pulley 7a, 7b, 8 of the elevator car 1 or the counterweight 2 can be measured by means of a measurement arrangement according to the invention. The measurement arrangement according to the invention allows measurement of the rotation speed of a rotatable component of an elevator. The component is rotatable about a rotation axis. In addition to elevators, the measurement arrangement could also be applied to an escalator, moving walkway or moving ramp. In an elevator, the rotatable component can be, for instance, a sheave, a pulley or an axle or shaft supporting such a pulley or sheave. The measurement arrangement comprises an inductive sensor that is arranged stationary in respect of the rotation axis of the component and adjacent to the component or adjacent to a measurement part that is attached to the component in a rotationally fixed manner. The component or the measurement part is configured as rotationally unsymmetrical about the rotation axis so that different angular positions of the component about the rotation axis generate different output signals in the inductive sensor.

The expression "inductive sensor" refers here to a sensor, which uses the principle of electromagnetic induction to detect the presence of a metallic object. The operation of a typical inductive sensor is based on creating an oscillating electromagnetic field by supplying alternating current to a coil. The presence of a metallic object causes changes in the frequency or current in the coil. These changes can be monitored either directly from the coil or using a second coil. The inductive sensor used in the arrangement according to the invention is configured to detect the magnitude of the changes in the electromagnetic field and to generate an output signal representing the changes in the electromagnetic field. The sensor can thus be used for example to determine a distance to a metallic object, instead of functioning as an on/off -type sensor. The inductive sensor can be a digital sensor.

The measurement arrangement according to the invention is reliable and inexpensive. By determining the rotation speed of a pulley 7a, 7b of an elevator car 1, the speed of the elevator car 1 can be determined. By determining the rotation speed of a pulley 8 of a counterweight 2, the speed of the counterweight 2 can be determined. Also the position of the elevator car 1 and/or the counterweight 2 can be determined based on the obtained speed data. Also the acceleration or deceleration of the elevator car 1 or the counterweight 2 can be determined.

Figure 2:
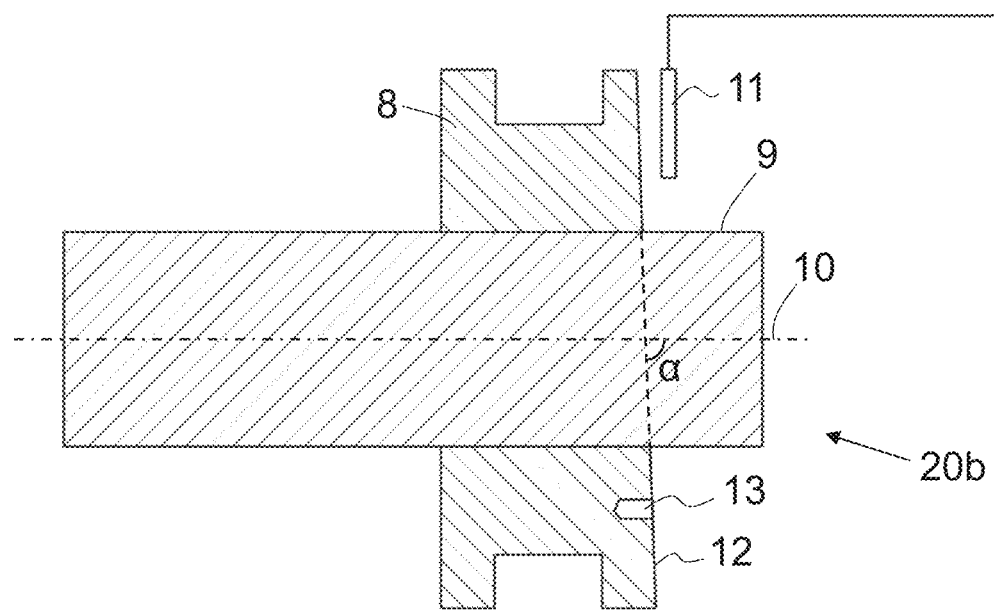
FIG. 2 shows schematically a simplified view of a measurement arrangement according to a first embodiment of the invention.

FIG. 2 shows a measurement arrangement 20b according to a first embodiment of the invention. In the embodiment of FIG. 2, the rotatable component is a pulley 8 of a counterweight. The pulley 8 is arranged around an axle 9. The pulley 8 is configured to be rotatable about a rotation axis 10. The axle 9 can be supported by means of at least one bearing and the pulley 8 can rotate with the axle 9. Alternatively, the axle 9 can be stationary and the pulley 8 can rotate around the axle 9. The pulley 8 could thus be supported by means of a bearing arranged on the axle 9.

The measurement arrangement is provided with an inductive sensor 11. In the embodiment of FIG. 2, the inductive sensor 11 is arranged adjacent to the pulley 8. One side surface 12 of the pulley 8 is configured so that the distance from the surface 12 to the inductive sensor 11 depends on the angular position of the pulley 8. The side surface 12 is arranged in respect of the rotation axis 10 of the pulley 8 at an angle a which differs from 90 degrees. The angle a between the rotation axis 10 and the surface 12 can be, for instance, 80-89 degrees. The inductive sensor 11 is configured to produce an output signal that depends on the distance between the sensor 11 and the surface 12. By determining the distance from the side surface 12 to the sensor 11, the angular position of the pulley 8 can be determined. By monitoring the angular position of the pulley 8, also the rotation speed of the pulley 8 can be determined.

Because the pulley 8 of the embodiment of FIG. 2 is not rotationally symmetrical, but the thickness of the pulley 8 in the axial direction of the pulley 8 varies, rotation of the pulley 8 creates inertial forces. In order to compensate the inertial forces caused by the varying thickness of the pulley 8, the pulley 8 can be provided with a drilling 13, as illustrated in FIG. 2. In the embodiment of FIG. 2, the drilling 13 extends inwards from the side surface 12 of the pulley 8 in the axial direction of the pulley 8. However, the drilling 13 could also be arranged on the opposite side surface of the pulley 8. Instead of or in addition to the drilling 13, the pulley 8 could be provided with some other kind of an area of removed or added material for balancing the pulley 8. For instance, the pulley 8 could be provided with a groove or a cutting on the thicker side, and/or with a protrusion or a counterweight on the thinner side of the pulley 8.

Figure 3:
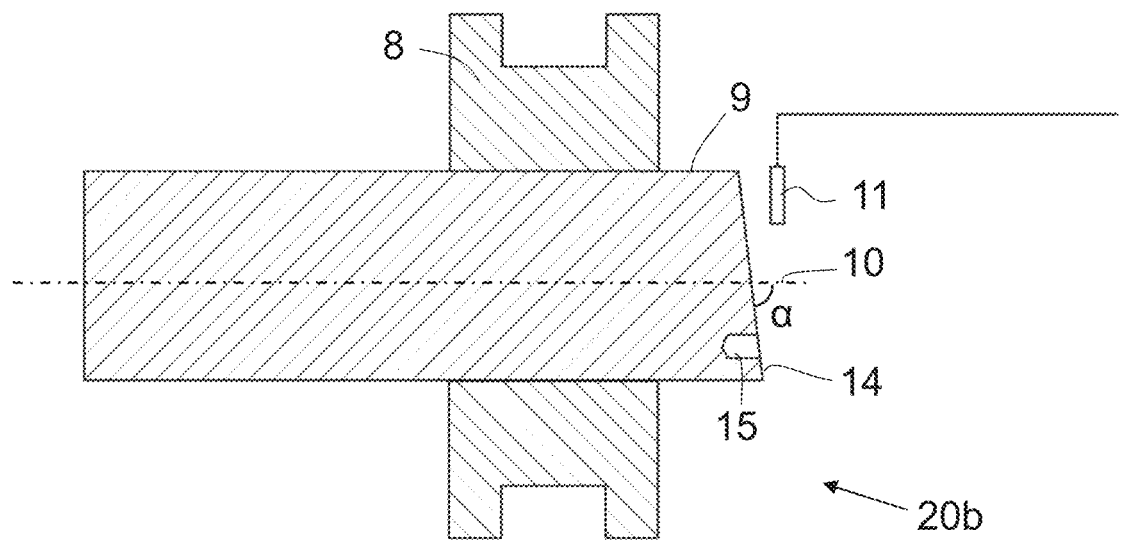
FIG. 3 shows schematically a simplified view of a measurement arrangement according to a second embodiment of the invention.

FIG. 3 shows a measurement arrangement 20b according to a second embodiment of the invention. In the embodiment of FIG. 3, the pulley 8 is supported by a rotatable axle 9. The axle 9 is thus supported by means of at least one bearing (not shown). The pulley 8 is attached to the axle 9 in a rotationally fixed manner. The rotation speed of the pulley 8 thus equals the rotation speed of the axle 9. Also the arrangement of FIG. 3 comprises an inductive sensor 11. The inductive sensor 11 is arranged to monitor the distance to an end surface 14 of the axle 9. In a similar way as in the embodiment of FIG. 2, the end surface 14 of the axle 9 is arranged in respect of the rotation axis 10 of the pulley 8 at an angle a which differs from 90 degrees. The angle a between the rotation axis 10 and the surface 14 can be, for instance, 80-89 degrees. In the embodiment of FIG. 3, the axle 9 is provided with a drilling 15 for balancing the axle 9. In the embodiment of FIG. 3, the drilling extends inwards from the end surface 14 of the axle 9 in the axial direction of the axle 9. However, the drilling could also extend radially inwards from the outer perimeter of the axle 9. Instead of the drilling or in addition to it, the axle 9 could be provided with some other kind of an area of removed or added material, such as a cutting or a groove or a counterweight. The operating principle of the arrangement of FIG. 3 is similar to the operating principle of the arrangement of FIG. 2. The angular position and the rotation speed of the pulley 8 correspond to the angular position and the rotation speed of the axle 9, respectively. By determining the rotation speed of the axle 9, the rotation speed of the pulley 8 can thus be determined.

Figure 4:
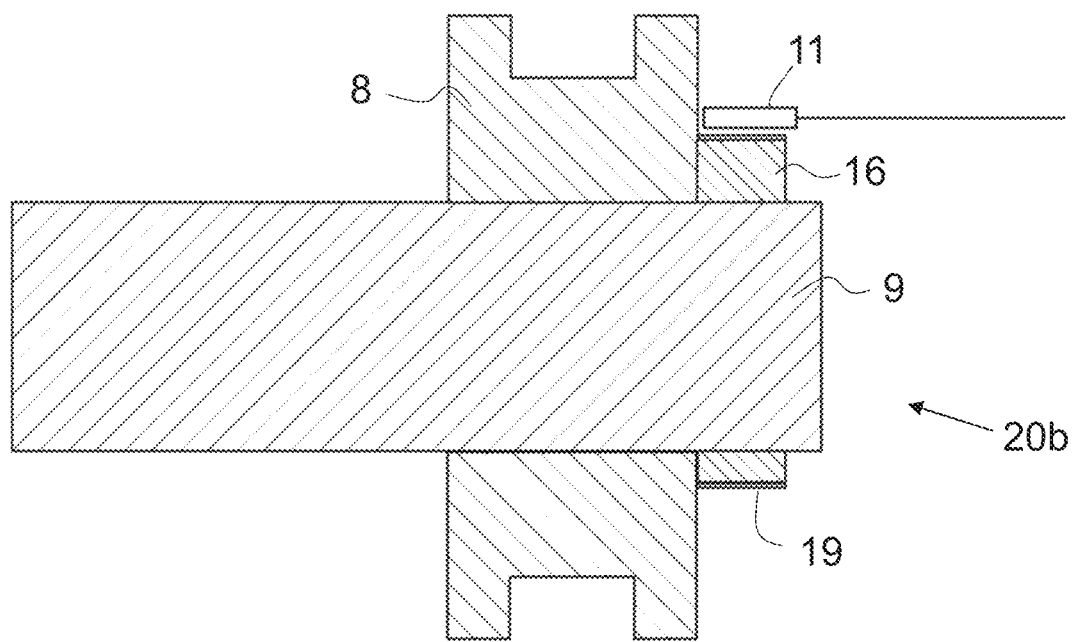
FIG. 4 shows schematically a simplified view of a measurement arrangement according to a third embodiment of the invention.
Figure 5:
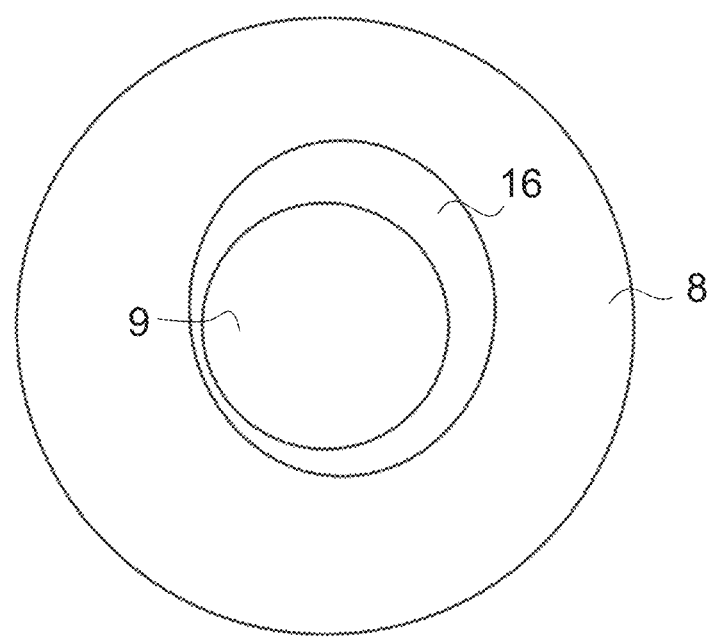
FIG. 5 shows another view of the arrangement of FIG. 4.

FIG. 4 shows a measurement arrangement 20b according to a third embodiment of the invention. FIG. 5 shows an end view of the arrangement of FIG. 4 (inductive sensor not shown). In the arrangement of FIGS. 4 and 5, an assembly comprising a pulley 8 and an axle 9 is provided with a separate measurement part 16, which is utilized in determination of the rotation speed of the pulley 8. In the embodiment of FIGS. 4 and 5, the pulley 8 is attached in a rotationally fixed manner to the axle 9. The measurement part 16 is attached in a rotationally fixed manner to the axle 9. If the pulley 8 rotated relative to the axle 9, the measurement part 16 would be attached in a rotationally fixed manner to the pulley 8. The arrangement is provided with an inductive sensor 11 which is arranged to monitor the distance to the outer perimeter 19 of the measurement part 16. The measurement part 16 is arranged around the axle 9 and it has a non-circular shape. The thickness of the measurement part 16 thus varies. As the axle 9 and the measurement part 16 rotate, the distance from the outer perimeter 19 of the measurement part 16 to the inductive sensor 11 varies. By monitoring the distance between the measurement part 16 and the sensor 11, the rotation speed of the measurement part 16 and the pulley 8 can be determined. In the embodiment of FIGS. 4 and 5, each distance from the outer perimeter 19 of the measurement part 16 to the inductive sensor 11 corresponds to two angular positions of the pulley 8. The absolute angular position of the pulley 8 can thus not be determined by means of the inductive sensor 11 alone. However, even in this embodiment the rotation speed of the pulley 8 can be determined. The absolute position of the pulley 8 could be determined, for instance, by providing the axle 9 with two measurement parts, measuring the distance from each measurement part to an inductive sensor, and combining the obtained information.

Figure 6:
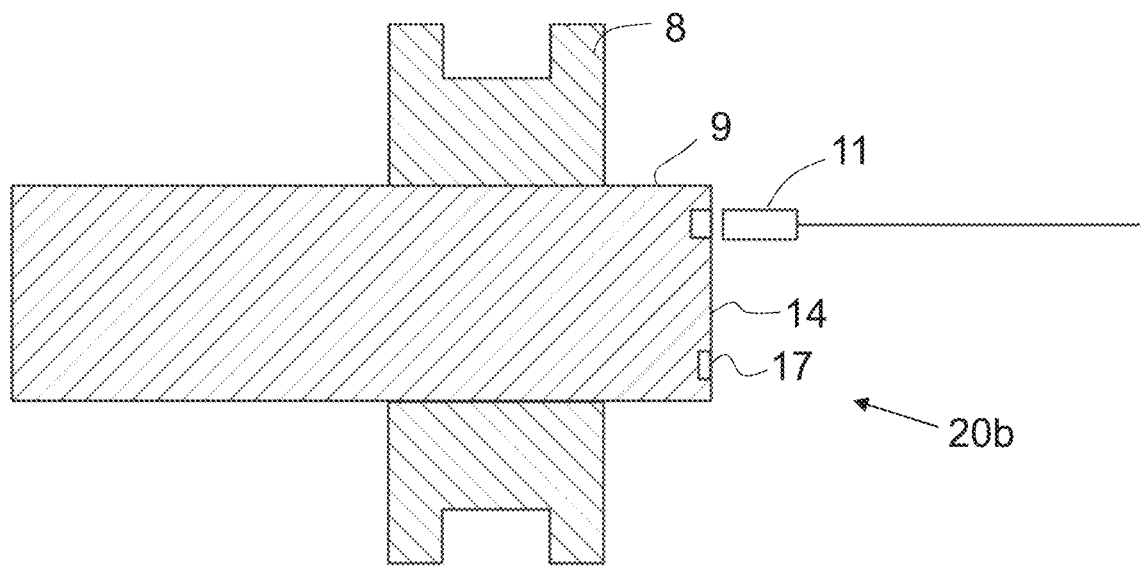
FIG. 6 shows schematically a simplified view of a measurement arrangement according to a fourth embodiment of the invention.
Figure 7:
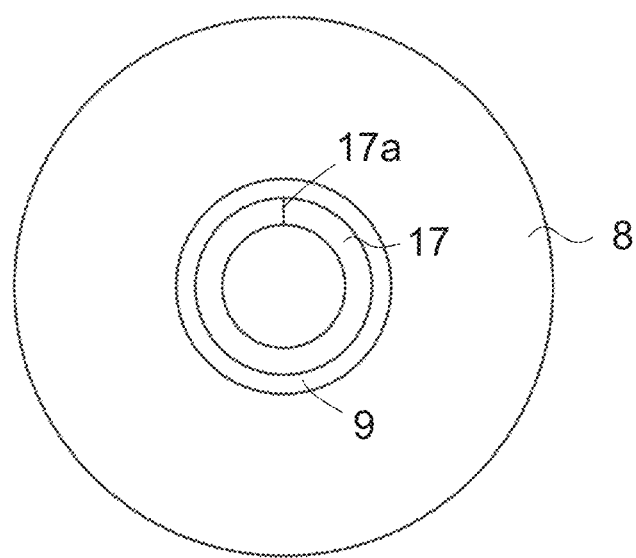
FIG. 7 shows another view of the arrangement of FIG. 6.

FIG. 6 shows a measurement arrangement 20b according to a fourth embodiment of the invention. FIG. 7 shows an end view of the arrangement of FIG. 6 (inductive sensor not shown). In the embodiment of FIGS. 6 and 7, an end surface 14 of the axle 9 is provided with a groove 17. The groove 17 is circular and extends over a full turn. The groove 17 has a varying depth. An inductive sensor 11 is arranged to measure the distance to the bottom of the groove 17. The groove 17 is configured so that each point along the groove 17 has an individual depth value. Each measured depth thus corresponds to a single point along the groove 17. The groove 17 has a point of discontinuity 17a. On a first side of the point of discontinuity 17a, the groove 17 has its greatest value. Going along the groove 17 away from the point of discontinuity the depth of the groove 17 decreases, and the depth of the groove 17 has it smallest value on a second side of the point of discontinuity 17a. Each measured distance from the inductive sensor 11 to the bottom of the groove 17 thus corresponds to a single angular position of the axle 9 and the pulley 8. Instead of arranging the groove 17 in the axle 9, the groove could also be arranged in the pulley 8. The groove does not have to be on an end surface of the axle 9 or in the pulley 8, but the groove could also be, for instance, on the outer perimeter of the axle 9.

Instead of having a varying depth, the groove 17 could have a varying width, and the inductive sensor 11 could be arranged to measure the distance to one of the side walls of the groove. A benefit of the arrangement of FIGS. 6 and 7 is that each angular position of the pulley 8 corresponds to a certain unique distance from the bottom of the groove 17 to the inductive sensor 11. The arrangement of FIG. 2 allows thus determining the absolute angular position of pulley 8 using a single inductive sensor 11.

Figure 8:
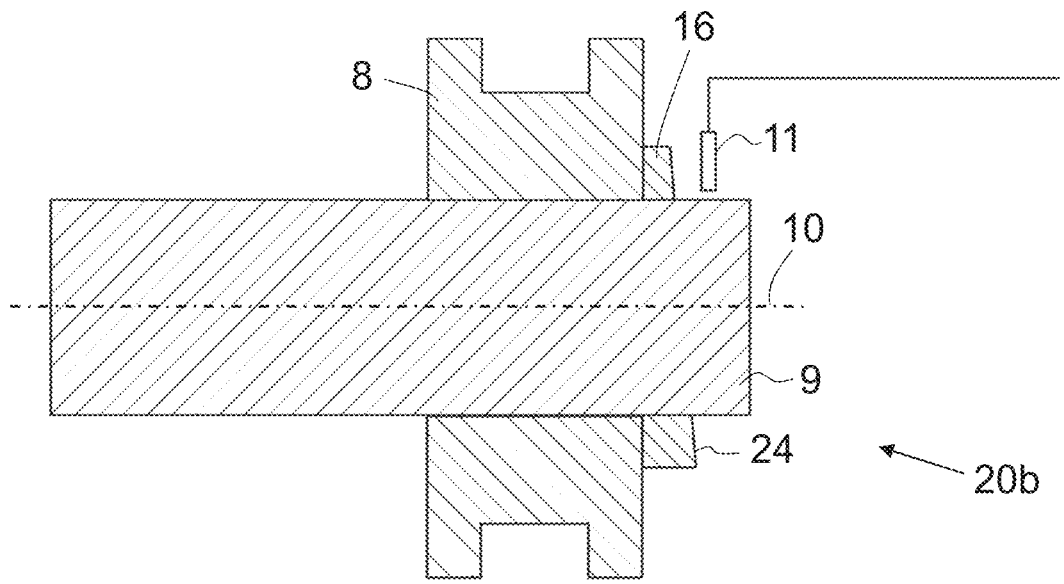
FIG. 8 shows schematically a simplified view of a measurement arrangement according to a fifth embodiment of the invention.

FIG. 8 shows a measurement arrangement according to a fifth embodiment of the invention. The arrangement is similar to the previous embodiments, in particular to the embodiments of FIGS. 3 and 4. As in the embodiment of FIG. 4, an assembly comprising a pulley 8 and an axle 9 is provided with a separate measurement part 16 which is utilized in determination of the rotation speed of the pulley 8. In the embodiment of FIG. 8, the pulley 8 is attached in a rotationally fixed manner to the axle 9. The measurement part 16 is attached in a rotationally fixed manner to the axle 9. If the pulley 8 rotated relative to the axle 9, the measurement part 16 would be attached in a rotationally fixed manner to the pulley 8. The arrangement is provided with an inductive sensor 11 which is arranged to monitor the distance to a side surface 24 of the measurement part 16.

The side surface 24 is arranged in respect of the rotation axis 10 of the pulley 8 at an angle which differs from 90 degrees. The angle between the rotation axis 10 and the surface 24 can be, for instance, 80-89 degrees. The inductive sensor 11 is configured to produce an output signal that depends on the distance between the sensor 11 and the surface 24. By determining the distance from the side surface 24 to the sensor 11, the angular position of the pulley 8 can be determined. The measurement part 16 of the embodiment of FIG. 8 can be provided with a drilling, cutting or counterweight for balancing inertial forces in a similar way as in the previous embodiments. A benefit of using a separate measurement part 16 is that the pulley 8 and the axle 9 do not have to be modified. The measurement arrangement could thus be applied to existing pulley-axle assemblies by adding a measurement part 16 and an inductive sensor 11.

The measurement arrangement could also be configured in many alternative ways. For instance, the outer perimeter of the axle 9 or the pulley 8 could be made non-circular or a side surface of the pulley 8 could be provided with a groove. Although embodiments of the invention have been described in connection with the pulley 8 of the counterweight 2, the rotation speed of a pulley of an elevator car 1 or a motor 5 can be measured in a similar way. In an escalator or a moving walkway, the rotation speed of a chain wheel could be monitored using a similar measurement arrangement.

In the embodiments of FIGS. 2, 3, 4, 5 and 8, each distance from the inductive sensor 11 to a monitored surface 12, 14, 19, 24 corresponds to two angular positions of the pulley 8 or the axle 9. The measurement data from the inductive sensor 11 can be combined with other data to determine the absolute angular position of the pulley 8 or the axle 9. For instance, two inductive sensors 11 can be used to measure the distance to two different surfaces in accordance with different embodiments of the invention, and by combining the data from the sensors 11, the absolute angular position of the pulley 8 can be determined. Alternatively or in addition to that, data from some other sensor, such as a sensor detecting that the elevator car 1 is at a certain landing, can be used for complementing the data provided by the inductive sensor 11.

Figure 9:
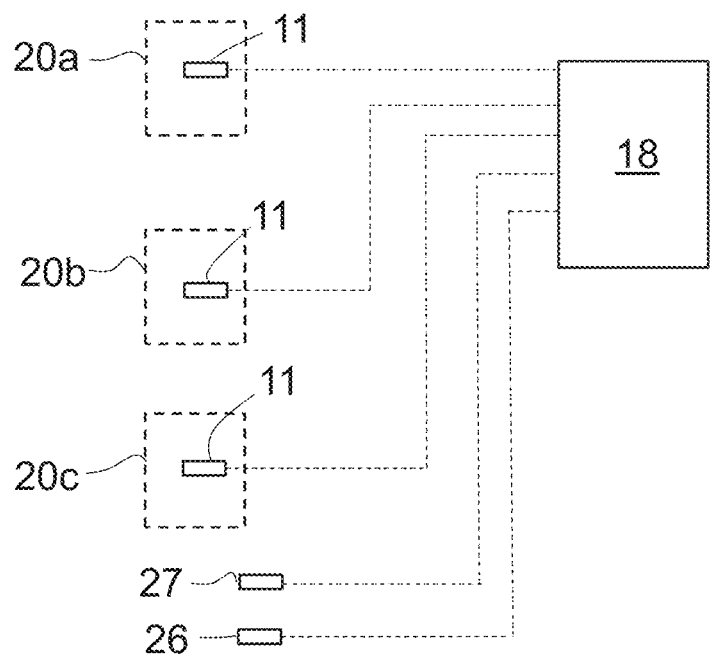
FIG. 9 shows schematically a monitoring system according to an embodiment of the invention.

The measurement arrangement according to the invention can be utilized in many different ways. FIG. 1 shows schematically an elevator comprising a first measurement arrangement 20a, a second measurement arrangement 20b and a third measurement arrangement 20c. FIG. 9 shows a monitoring system comprising the first, second and third measurement arrangements 20a, 20b, 20c.

The first measurement arrangement 20a is arranged to measure the rotation speed of a pulley 7a of an elevator car 1. Based on the measurement data from the first measurement arrangement 20a, the speed and/or position of the elevator car 1 can be determined. The second measurement arrangement 20b is arranged to measure the rotation speed of the pulley 8 of the counterweight 2. Based on the measurement data from the second measurement arrangement 20b, the speed and/or position of the counterweight 2 can be determined. The measurement data from the second measurement arrangement 20b may be compared to the measurement data from the first measurement arrangement 20a. Alternatively, the speed of the counterweight 2 determined on the basis of the measurement data can be compared to the speed of the elevator car 1. A speed difference can be an indication of a stalling situation, where the elevator car 1 or the counterweight 2 is ascending at a desired speed whereas the descending part is stopped due to reaching the bottom of the shaft 3 or due to jamming. This causes slackening of the hoisting member 4. The movement of the elevator car 1 or the counterweight 2 may continue until it reaches the upper end of the shaft 3 or until the friction force of the hoisting member 4 against the sheave 6 of the motor 5 is insufficient to maintain the movement of the ascending part. Both situations are dangerous, as hitting of the upper end of the shaft 3 may cause significant damage and disappearing of the friction force between the sheave 6 and the hoisting member 4 causes free fall of the elevator car 1 or the counterweight 2.

The third measurement arrangement 20c is arranged to measure the rotation speed of another pulley 7b of the elevator car 1. The third measurement arrangement 20c can be used as a back-up for the first measurement arrangement. Measurement data from the first measurement arrangement 20a can also be compared to measurement data from the third measurement arrangement 20c. In case the comparison indicates a speed difference between the first pulley 7a and the second pulley 7b, the hoisting member 4 may be slipping on one of the pulleys 7a, 7b. This may be an indication of a bearing failure and a warning signal may be generated.

FIG. 9 shows the inductive sensors 11 of the measuring arrangements 20a, 20b, 20c connected to a control unit 18.

Also the sensors 26, 27 detecting whether the elevator car 1 is at a certain landing are connected to the control unit 18. A signal from a sensor 26, 27 detecting the presence of the elevator car 1 at a certain landing can be used as a reference point, and by using measurement data from the first or the third measuring arrangement 20a, 20c, the vertical position of the elevator car 1 can be determined even between the landings. This allows, for example, calculating the distance of the elevator car 1 to the end buffer 27 or to the upper end of the shaft 3. The determined distance and the speed of the elevator car 1 can be used as inputs for speed control of the elevator car 1 as the elevator car 1 approaches one end of the shaft 3. This helps ensuring that the deceleration of the elevator car 1 does not exceed predetermined limit values.

The measurement arrangement according to the invention could also be used for measuring the rotation speed of the sheave 6 driven by the motor 5. The measurement data could be compared to the rotation speed of a pulley 7a, 7b of the elevator car 1 and/or the pulley 8 of the counterweight 2. Also the speed of the hoisting member 4 could be determined on the basis of the measurement data and compared to the speed of the elevator car 1 and/or the counterweight 2. A speed difference can be an indication of slipping of the hoisting member 4 on the sheave 6 driven by the motor 5 or jamming of a bearing of a pulley 7a, 7b, 8 of the elevator car 1 or the counterweight 2. By comparing the rotation speed of the sheave 6 driven by the motor 5 and the rotation speed of a pulley 7a, 7b, 8 of the elevator car 1 and/or the counterweight 2, also certain overspeed situations could be detected. It is not necessary that all the rotation speeds are determined using a measuring arrangement according to the invention, but it is possible to combine data from different sources. For instance, the rotation speed of a pulley 7a, 7b, 8 of the elevator car 1 or the counterweight 2 could be determined by means of a measuring arrangement according to the invention, but the rotation speed of the sheave 6 driven by the motor 5 could be determined based on the rotation speed of the motor 5.

It will be appreciated by a person skilled in the art that the invention is not limited to the embodiments described above but may vary within the scope of the appended claims.

The invention claimed is:

1. A measurement arrangement for measuring a rotation speed of a component of an elevator, escalator, moving walkway or moving ramp, the component being rotatable about a rotation axis, and the arrangement comprising:
   the component or a measurement part attached to the component in a rotationally fixed manner, the component or the measurement part being rotationally unsymmetrical about the rotation axis; and
   an inductive sensor adjacent to the component or the measurement part, the inductive sensor being stationary in respect of the rotation axis of the component, the component or the measurement part having a surface that is shaped or positioned such that a distance from the surface to the inductive sensor changes as the component rotates about the rotation axis, and the inductive sensor being configured to generate different output signals corresponding to different angular positions of the component about the rotation axis.

2. The measurement arrangement according to claim 1, wherein the inductive sensor is configured to generate the different output signals by detecting a changing distance between the inductive sensor and the surface.

3. The measurement arrangement according to claim 1, wherein the surface is a plane that is arranged in respect of the rotation axis of the component at an angle that differs from 90 degrees.

4. The measurement arrangement according to claim 1, wherein the surface is a non-circular outer perimeter of the component or the measurement part.

5. The measurement arrangement according to claim 1, wherein the surface is a circular groove or a circular cutting.

6. The measurement arrangement according to claim 1, wherein the component is a sheave, a pulley, a chain wheel, or an axle or shaft supporting the sheave, the pulley or the chain wheel.

7. The measurement arrangement according to claim 1, wherein the component or the measurement part includes an area of removed or added material to compensate for an effect of an unsymmetrical shape of the component or the measurement part on inertial forces of the component or the measurement part.

8. The measurement arrangement according to claim 1, wherein the component or the measurement part includes a drilling to compensate for an effect of an unsymmetrical shape of the component or the measurement part on inertial forces of the component or the measurement part.

9. The measurement arrangement according to claim 1, wherein the component is attached to an elevator car or to a counterweight of the elevator.

10. The measurement arrangement according to claim 1, wherein the inductive sensor is configured to output a unique output signal corresponding to each angular position of the component about the rotation axis based on the surface.

11. A monitoring system comprising a measurement arrangement according to claim 1 configured to monitor a rotation speed of a component of an elevator, escalator, moving walkway or moving ramp.

12. An elevator comprising a measurement arrangement according to claim 1.

13. A method of monitoring a rotation speed of a component of an elevator, escalator, moving walkway or moving ramp, the rotation speed being monitored by means of a measurement arrangement according to claim 1.

14. The measurement arrangement according to claim 2, wherein the surface is a plane that is arranged in respect of the rotation axis of the component at an angle that differs from 90 degrees.

15. The measurement arrangement according to claim 2, wherein the surface is a non-circular outer perimeter of the component or the measurement part.

16. The measurement arrangement according to claim 2, wherein the surface is a circular groove or a circular cutting.

17. The measurement arrangement according to claim 5, wherein the circular groove or the circular cutting has a varying depth.

18. The measurement arrangement according to claim 5, wherein the circular groove or the circular cutting has a varying width.

19. The elevator according to claim 12, wherein
   the measurement arrangement is a first measurement arrangement configured to monitor a rotation speed of a pulley of an elevator car; and
   the elevator further comprises a second measurement arrangement configured to monitor a rotation speed of a pulley of a counterweight of the elevator.

20. The measurement arrangement according to claim 16, wherein the circular groove or the circular cutting has a varying depth or a varying width.

* * * * *